US011665989B2

(12) United States Patent
Fanshier et al.

(10) Patent No.: US 11,665,989 B2
(45) Date of Patent: Jun. 6, 2023

(54) IMPLEMENT CONTOURING TOOLBAR

(71) Applicant: AGCO Corporation, Duluth, GA (US)

(72) Inventors: Benjamin Anson Fanshier, Hesston, KS (US); Rex Schertz, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 647 days.

(21) Appl. No.: 16/470,472

(22) PCT Filed: Oct. 26, 2017

(86) PCT No.: PCT/IB2017/001298
§ 371 (c)(1),
(2) Date: Jun. 17, 2019

(87) PCT Pub. No.: WO2018/109545
PCT Pub. Date: Jun. 21, 2018

(65) Prior Publication Data
US 2020/0084951 A1    Mar. 19, 2020

Related U.S. Application Data

(60) Provisional application No. 62/435,118, filed on Dec. 16, 2016.

(51) Int. Cl.
*A01B 63/114* (2006.01)
*A01B 63/102* (2006.01)
(Continued)

(52) U.S. Cl.
CPC .......... *A01B 63/114* (2013.01); *A01B 63/102* (2013.01); *A01B 63/1112* (2013.01); *A01B 63/28* (2013.01)

(58) Field of Classification Search
CPC . A01B 63/114; A01B 63/102; A01B 63/1112; A01B 63/28; A01B 63/045;
(Continued)

(56) References Cited

U.S. PATENT DOCUMENTS 4,825,958 A   5/1989   Kelderman
5,065,681 A   11/1991  Hadley
(Continued)

FOREIGN PATENT DOCUMENTS

AU    2010201330 A1    3/2011
DE    102009044898 A1 *  6/2011   .......... A01B 63/008
(Continued)

OTHER PUBLICATIONS

European Patent Office. International Search Report for International Application No. PCT/IB2017/001298, dated Jan. 25, 2018.
(Continued)

*Primary Examiner* — Jessica H Lutz (57) ABSTRACT

In one embodiment, a frame member; a toolbar coupled to the frame member, the toolbar parallel to, and rearward of, the frame member; a row unit coupled to the toolbar; and an actuator coupled between the frame member and the toolbar, the actuator configured to rotate the toolbar based on a sensed position of the toolbar.

18 Claims, 7 Drawing Sheets

(51) Int. Cl.
*A01B 63/111* (2006.01)
*A01B 63/28* (2006.01)

(58) Field of Classification Search
CPC ....... A01B 63/008; A01B 63/10; A01B 49/00; A01B 49/027
See application file for complete search history.

(56) References Cited

U.S. PATENT DOCUMENTS

| | | | |
|---|---|---|---|
| 5,479,992 A * | 1/1996 | Bassett | A01B 63/114 111/134 |
| 5,499,683 A * | 3/1996 | Bassett | A01B 63/114 172/239 |
| 5,511,623 A | 4/1996 | Frasier | |
| 5,590,721 A * | 1/1997 | Van Mill | A01B 63/22 172/488 |
| 5,653,292 A * | 8/1997 | Ptacek | A01C 7/203 172/310 |
| 6,076,611 A | 6/2000 | Rozendaal et al. | |
| 6,112,827 A * | 9/2000 | Reiber | A01B 73/065 172/311 |
| 6,263,977 B1 * | 7/2001 | Mayerle | A01B 63/102 172/311 |
| 6,378,619 B2 * | 4/2002 | Mayerle | A01B 63/11 172/2 |
| 7,921,931 B2 * | 4/2011 | Henry | A01B 61/04 111/151 |
| 8,573,319 B1 * | 11/2013 | Casper | A01B 63/114 172/4 |
| 8,857,530 B2 * | 10/2014 | Henry | A01B 63/114 172/4 |
| 9,031,749 B2 | 5/2015 | Hubalek | |
| 9,253,937 B2 * | 2/2016 | Horsch | A01B 73/048 |
| 9,301,439 B2 * | 4/2016 | Gilstring | A01B 63/114 |
| 9,615,500 B2 * | 4/2017 | Sudbrink | A01B 49/027 |
| 9,635,797 B2 * | 5/2017 | Kovach | A01B 29/048 |
| 9,686,899 B2 * | 6/2017 | Kovach | A01B 33/025 |
| 9,930,823 B2 * | 4/2018 | Jagow | A01B 63/145 |
| 10,368,471 B2 * | 8/2019 | Knobloch | A01B 23/043 |
| 10,368,474 B2 * | 8/2019 | Blunier | A01B 63/32 |
| 10,405,476 B2 * | 9/2019 | Bell | A01B 29/04 |
| 10,412,873 B2 * | 9/2019 | Achten | A01B 49/02 |
| 10,412,875 B2 * | 9/2019 | Kovach | A01B 63/008 |
| 10,506,756 B2 * | 12/2019 | Fanshier | A01B 63/32 |
| 10,537,052 B2 * | 1/2020 | Friggstad | A01B 63/008 |
| 10,561,052 B2 * | 2/2020 | Barrick | A01B 79/005 |
| 10,602,653 B2 * | 3/2020 | Henry | A01B 73/00 |
| 10,750,653 B2 * | 8/2020 | Sporrer | A01B 5/04 |
| 10,813,265 B2 * | 10/2020 | Stanhope | A01B 69/007 |
| 10,820,470 B2 * | 11/2020 | Wu | F15B 13/042 |
| 10,820,471 B2 * | 11/2020 | Wu | F15B 20/00 |
| 10,827,665 B2 * | 11/2020 | Sporrer | A01B 63/008 |
| 10,925,203 B2 * | 2/2021 | Plattner | A01B 3/24 |
| 10,939,604 B2 * | 3/2021 | Sporrer | A01B 76/00 |
| 10,959,367 B2 * | 3/2021 | Zemenchik | A01B 63/008 |
| 11,197,408 B2 * | 12/2021 | Ferrari | A01B 79/02 |
| 2002/0017090 A1 | 2/2002 | Hockenbeck | |
| 2002/0017389 A1 | 2/2002 | Moser et al. | |
| 2003/0024450 A1 | 2/2003 | Juptner | |
| 2008/0308020 A1 | 12/2008 | Ryder et al. | |
| 2011/0120357 A1 | 5/2011 | Schilling et al. | |
| 2011/0284252 A1 | 11/2011 | Friggstad et al. | |
| 2011/0315410 A1 * | 12/2011 | Kinzenbaw | A01C 7/208 172/1 |
| 2012/0298388 A1 * | 11/2012 | Bauer | A01B 73/065 172/311 |
| 2013/0062083 A1 * | 3/2013 | Casper | A01B 63/16 172/452 |
| 2013/0112123 A1 * | 5/2013 | Turko | A01B 35/16 111/151 |
| 2013/0112124 A1 * | 5/2013 | Bergen | A01C 7/205 111/151 |
| 2014/0041563 A1 * | 2/2014 | Henry | A01B 79/005 111/139 |
| 2014/0069670 A1 * | 3/2014 | Friesen | A01B 73/02 172/311 |
| 2014/0196996 A1 | 7/2014 | Ito et al. | |
| 2015/0012189 A1 * | 1/2015 | Henry | A01C 5/066 701/50 |
| 2015/0053439 A1 * | 2/2015 | Ohnsat | A01B 21/08 172/569 |
| 2015/0156955 A1 | 6/2015 | Sudbrink et al. | |
| 2015/0230391 A1 | 8/2015 | Houck | |
| 2015/0289438 A1 * | 10/2015 | Sauder | A01B 79/005 701/50 |
| 2016/0134844 A1 * | 5/2016 | Casper | H04N 7/181 348/135 |
| 2017/0339819 A1 * | 11/2017 | Kowalchuk | A01C 5/068 |
| 2018/0070523 A1 * | 3/2018 | Prince | A01B 27/005 |
| 2018/0116095 A1 * | 5/2018 | Knobloch | A01B 23/043 |
| 2018/0295769 A1 * | 10/2018 | Friggstad | A01B 63/008 |
| 2019/0021211 A1 * | 1/2019 | Gutknecht | A01B 63/22 |
| 2019/0150350 A1 * | 5/2019 | Engel | A01C 7/203 |
| 2019/0373801 A1 * | 12/2019 | Schoeny | A01B 79/005 |
| 2020/0093052 A1 * | 3/2020 | Preimess | A01B 63/32 |
| 2020/0146201 A1 * | 5/2020 | Figueroa | A01B 63/24 |
| 2020/0236873 A1 * | 7/2020 | Albrecht | A01G 13/0287 |
| 2021/0298215 A1 * | 9/2021 | Kovach | A01B 63/008 |
| 2022/0132720 A1 * | 5/2022 | Gray | A01B 73/065 172/184 |

FOREIGN PATENT DOCUMENTS

| | | |
|---|---|---|
| DE | 102006034798 B4 | 2/2014 |
| EP | 1859670 A1 | 11/2007 |
| EP | 2335465 B1 | 5/2012 |
| EP | 2 524 587 A1 | 11/2012 |
| WO | 2003/096785 A1 | 11/2003 |
| WO | 2014/066654 A1 | 5/2014 |

OTHER PUBLICATIONS

UK Intellectual Property Office, Search report for related UK Application No. GB 1700585.1, dated Jul. 17, 2017.
INPI, Notice of 3rd Party Petition submitted for related Brazilian Patent Appliation No. BR112019010534-4, dated Jan. 17, 2022, 30 pages.
INPI, Notice of 3rd Party Petition submitted for related Brazilian Patent Application No. BR112019010534-4, dated Aug. 18, 2022, 39 pages.
Brazilian Patent Office, Third Party Petition for related BR Application No. BR112019010534-4, dated Jan. 17, 2023, 88 pages (including translation).
Brazilian Patent Office, Office Action (with translation) for related BR Application No. BR112019010534-4, dated Jan. 14, 2023, 16 pages.

* cited by examiner

IMPLEMENT CONTOURING TOOLBAR

TECHNICAL FIELD

The present disclosure is generally related to implements, and, more particularly, agricultural implements.

BACKGROUND

Implements, such as agricultural implements, are used to enable the engagement of tool attachments, including row units, with the soil for seeding, fertilizing, soil agitation, etc. As implements continue to get wider, they tend to have longer, rigid sections that do not handle uneven fields well. For instance, the field may comprise gullies and/or terraces that compromise the ability of the row units to properly operate in the field. As an example, when a planter encounters a terrace, frame wheels of the implement lift the row units up and out of the ground. Conversely, as the wheels go down the back of the terrace, the entire weight of the frame rests on the row units. In either case, possible detrimental results include insufficient crop yield due to seeds being planted too shallow or too deep.

BRIEF DESCRIPTION OF THE DRAWINGS

Many aspects of a contouring toolbar system of the present disclosure can be better understood with reference to the following drawings. The components in the drawings are not necessarily to scale, emphasis instead being placed upon clearly illustrating the principles of a contouring toolbar system. Moreover, in the drawings, like reference numerals designate corresponding parts throughout the several views.

DESCRIPTION OF EXAMPLE EMBODIMENTS

Overview

In one embodiment, a frame member; a toolbar coupled to the frame member, the toolbar parallel to, and rearward of, the frame member; a row unit coupled to the toolbar; and an actuator coupled between the frame member and the toolbar, the actuator configured to rotate the toolbar based on a sensed position of the toolbar.

Detailed Description

Certain embodiments of a contouring toolbar system and method are disclosed that enable an implement with row units to navigate across uneven fields while controlling a relationship of a row unit toolbar to the ground independently of the implement, frame-mounted wheels. In one embodiment, a contouring toolbar system comprises an actuator coupled between a frame member and a toolbar, the actuator retracted or extended based on the position of the toolbar as sensed by one or more sensors, which in turn maintains the coupled row units properly engaged with (e.g., seeding) the soil despite the contoured surfaces of the field. In some embodiments, the contouring toolbar system uses the sensed position of the toolbar to enable in-field planting operations, including lifting and turning at the end of the field.

Digressing briefly, most implement designs (e.g., planters) comprise a row unit toolbar that remains rigid as the implement moves over contoured field surfaces. When the implement is towed over a terrace, for instance, the row unit may be lifted off of the ground due to the rigid structures involved, resulting in a shallow or surface-level seed depth. In other instances, such as when the row unit is approaching a valley or gulley where the towing vehicle is at a higher elevation, the row unit may receive the entire weight load of the frame, resulting in a seed depth that is excessive and possibly causing damage to the row unit. In contrast, certain embodiments of a contouring toolbar system actively control the rotation of the row unit toolbar, adapting the rotation to follow the contoured field surfaces and hence always attempting to keep the row units engaged with the ground (e.g., by attempting to control the toolbar to be at a level position relative to the ground, or stated otherwise, maintain a relatively consistent elevation of the toolbar relative to ground).

Having summarized various features of certain embodiments of a contouring toolbar system of the present disclosure, reference will now be made in detail to the detailed description of a contouring toolbar system as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of a contouring toolbar system as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the implement looking forwardly.

Figure 1:
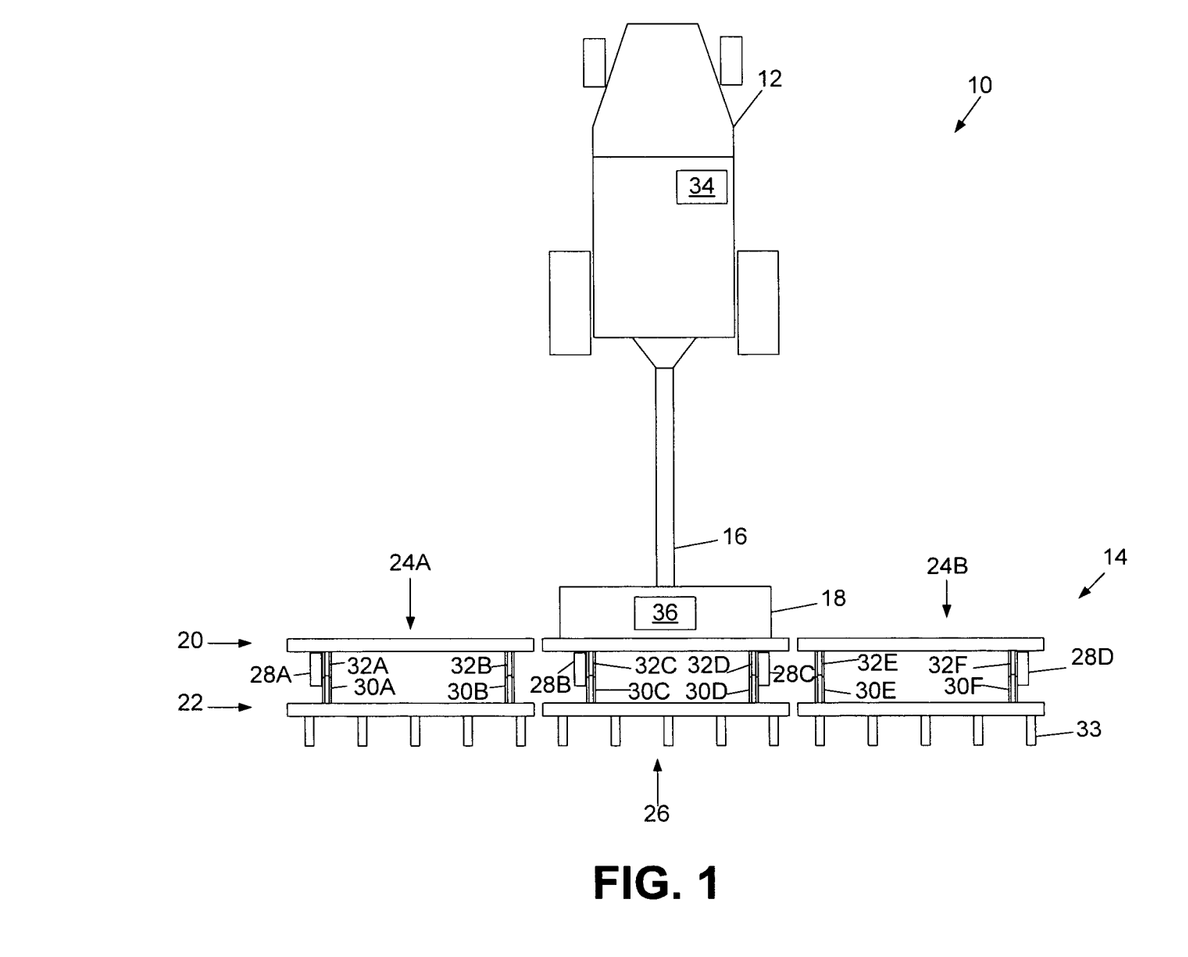
FIG. 1 is a schematic diagram that illustrates an example environment in which an embodiment of an example contouring toolbar system may be used.

Attention is now directed to FIG. 1, which is a schematic diagram that illustrates an example environment 10 in which an embodiment of a contouring toolbar system may be used. It should be appreciated by one having ordinary skill in the art, in the context of the present disclosure, that the environment 10 depicted in FIG. 1 is merely illustrative of one example environment, and that in some embodiments, other environments may be used. The example environment 10 includes a towing vehicle 12, in this example a tractor, towing an implement 14. The tractor 12 and implement 14 are depicted in fragmentary view. In some embodiments, other types of towing vehicles, including a self-propelled vehicle with an integrated implement (in lieu of a towed implement) or towing vehicles of other axle arrangements or other chassis configurations may be used, and hence are contemplated to be within the scope of the disclosure. The tractor 12 is coupled to the implement 14 using any known hitch and/or tongue assembly 16. The implement 14 may support equipment 18, which may include one or more product containers, control components, pumps, reservoirs, among other equipment used to dispense product and control functioning of the implement and/or its attachments. The implement 14 comprises a chassis that includes parallel frame members 20, 22 in fore and aft arrangement, respectively, when deployed (e.g., when the implement 14 is towed in the forward direction). In the depicted example, the implement 14 is extended in a transverse direction relative to the direction of field traversal. The implement 14 is segmented into wing sections 24 (e.g., 24A, 24B) and a center section 26 that supports the equipment 18 and trails directly behind the tractor 12. In some embodiments, the implement 14 may be towed in an orientation where the center section 26 is physically offset from the center of the tractor 12. Although not detailed in FIG. 1, the wing sections 24 are respectively coupled to the center section 26 in pivotal manner, enabling a folding in a plane occupied by the tractor 12 and implement 14 for narrow-profile transport. In some embodiments, the folding of the wings 24 may be achieved outside of the plane of the tractor 12 and implement 14 (e.g., folded upward above the plane and rearward). Coupled to the frame members 20 of the wing sections 24A, 24B and center section 26 are respective wheels 28 (e.g., 28A to frame member 20 of wing section 24A, 28B-28C to frame member 20 of center section 26, and 28D to frame member 20 of wing section 24B). Some embodiments of a contouring toolbar system may use additional wheels (e.g., in tandem, as duals, or otherwise) in the same or different positions, or arrange the wheels in different locations than shown. For instance, in some embodiments, the wheels 28 may not be disposed between the frame members 20, 22. However, in the depicted example, the wheels 28 are disposed between the frame members 20, 22. Each frame member 20, 22 comprises bracket arms 42 (not designated in FIG. 1, but shown in FIGS. 2) and 30 (e.g., 30A-30F), respectively, that pivotably couple (e.g., via hinged joint to bracket arms of the frame member 20) the frame members 22 to the frame members 20.

Attached at the bracket arms 30A, 30B, 30E, 30F of the wing sections 24A, 24B are actuators 32 (e.g., 32A, 32B, 32E, and 32F), and attached to bracket arms 30C, 30D of the center section 26 are actuators 32 (e.g., 32C, 32D). Note that the location and/or quantity of bracket arms 30 and/or actuators 32 depicted in FIG. 1 is for illustration of one embodiment, and that in some embodiments, different and/ or additional quantities and/or locations may be used. The actuators 32 may be configured as single rod hydraulic actuators (e.g., a linear-acting, piston and rod assembly, though in some embodiments, rotary actuation may be used). In some embodiments, the actuators 32 may be configured as either pneumatic, electric, magnetic, or electromagnetic actuators. The actuators 32 are configured to rotate the frame members 22 (e.g., the toolbar) of the wing and center sections 24, 26 to/from any position along a range of positions throughout an approximately one hundred ten (110) degree range, though in some embodiments, the range may be more or less. For instance, for field work and transport operations, the actuators 32 may rotate the frame members 22 relative to the frame members 20 to angular positions of zero (0) degrees (e.g., working a level or even surface of the field), approximately 20-40 degrees (e.g., raising the frame member 22 to clear a minimum recommended headlands elevation or a maximum recommended headlands rotation, respectively), and approximately 90 degrees (e.g., for narrow transport). Note that the angular position is construed relative to a horizontal plane of the frame members 20. The actuators 32 are also configured to rotate the frame members 22 of the wing and center sections 24, 26 to angular positions below the center or zero degree position. For instance, in one embodiment, the actuators 32 may be extended (e.g., the rods extended) to an angular position of approximately 10 degrees below the zero degree reference (below level), such as to accommodate hills traversals, or even greater angles (as suggested by the 25 degree angle in FIG. 3, described below. In other words, the angular span of positions to which the frame member 22 may be rotated relative to the frame member 20 comprises an obtuse angle (e.g., over 90 degrees).

Removeably attached to the frame members 22 and arranged rearward to the frame members 22 are soil working tools 33, including row units that seed, fertilize, and/or agitate the soil. Though shown completely rearward of the frame members 22, in some embodiments, the row units 33 may be alternately staggered, with the row units 33 position completely rearward and slightly forward and rearward of the frame member 22. Other configurations may be used, as should be appreciated by one having ordinary skill in the art.

The tractor 12 also comprises a controller 34 that causes actuation of the actuators 32 based on operator input, software and/or device input, and/or sensor signals as explained further below. For instance, where the actuators 32 are configured as hydraulic cylinders, hydraulic fluid control may be achieved via a control component 36 that comprises one or more manifolds, each comprising one or more control valves that control a state of the hydraulic cylinders 32 (e.g., control the change in pressure and/or change in flow rate of hydraulic fluid through the cylinders). Actuation of the control component 36 may be achieved wirelessly or via wired connection (e.g., Isobus) according to commands from the controller 34.

Note that the contouring toolbar system may include the components described for the entire environment 10 in some embodiments, or a subset of the described components in some embodiments.

Figure 2:
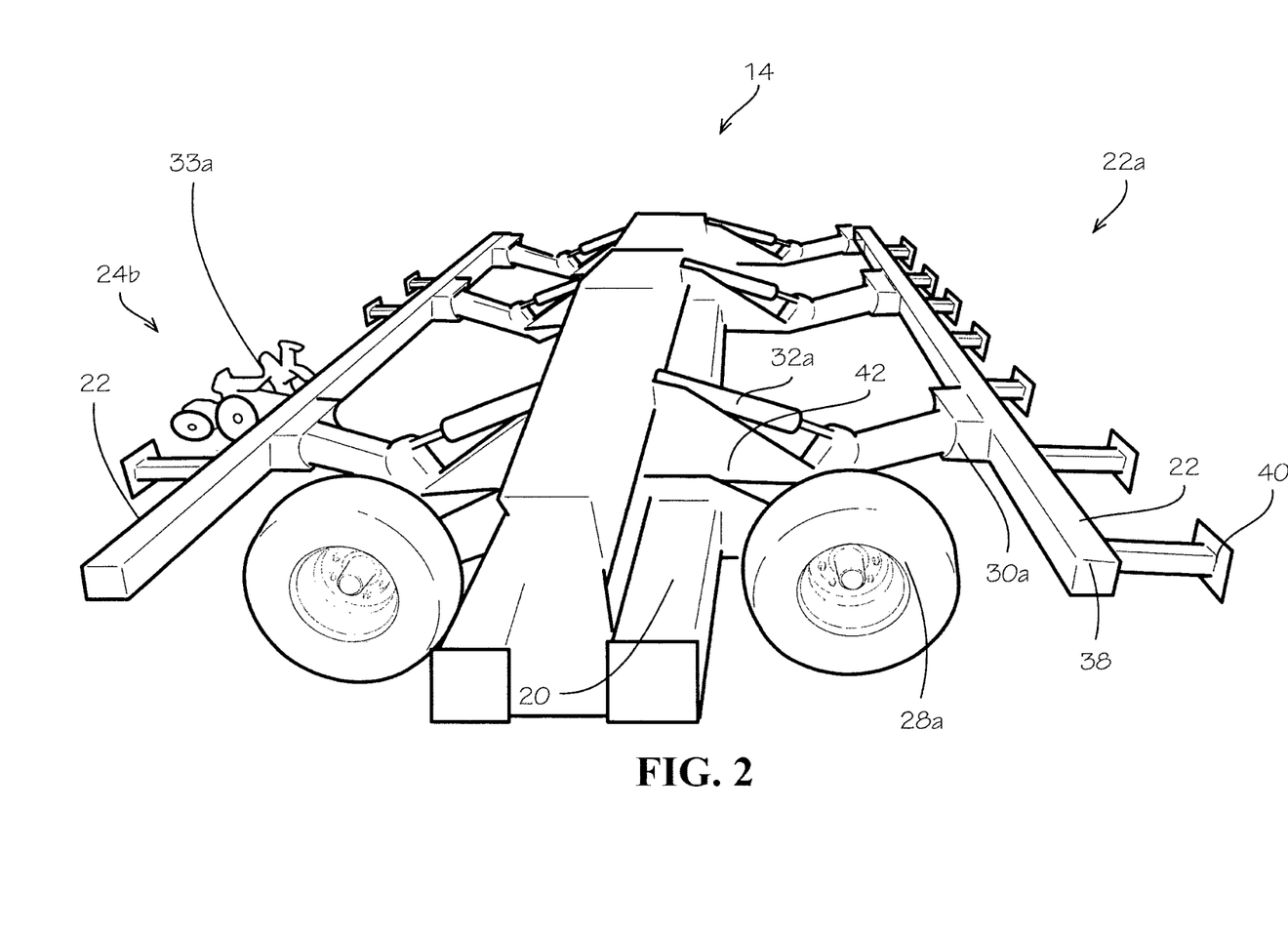
FIG. 2 is a schematic diagram that illustrates, in side elevation view, an embodiment of an example contouring toolbar system with the toolbar in a flat or zero angle position.

Having generally described an example environment 10 in which an embodiment of a contouring toolbar system may be used, attention is directed to FIG. 2, which illustrates an example implement 14 with a level or zero angle position of the frame member 22 relative to the frame member 20. In the depicted example, the wing sections 24 are folded forward relative to the center section 26. Only one row unit 33A is depicted as attached to the frame member 22, with the understanding that additional row units would typically be attached along the frame members 22. Referring to wing section 24A in particular with primary focus on the components associated with the actuator 32A, with the understanding that a similar description applies to the rotational components of the rest of the wing section 24A, the wing section 24B, and the center section 26 but omitted here for brevity, the frame member 22 comprises a toolbar 38. The toolbar 38 may be rectangular in shape, and comprises in one embodiment on the rearward side, tool brackets 40 that are uniformly spaced along the toolbar 38. The tool brackets 40 are secured to the toolbar 38 according to any known securement mechanism, including weld, bolts, etc. The tool brackets 40 facilitate attachment of respective soil working tools, such as row units 33A. On the opposing side of the toolbar 38 are the bracket arms 30, which extend forwardly from the toolbar 38. The bracket arms 30 couple via a hinged joint to rearward extending bracket arms 42 extending from the frame member 20.

Enabling rotation of the frame members 20, 22 are the plural actuators 32 (e.g., 32A). In one embodiment, the actuator 32A (as with the other actuators 32) is attached to an upper portion of the frame member 20 (e.g., at or proximal to the upper portion of the bracket arm 42) and the bracket arm 30 opposite the toolbar 38. Other locations may be used as long as the rotation of the toolbar 38 is achieved relative to the frame member 20. In FIG. 2, the actuators 32 have rotated the toolbar 38 to a zero (0) degree angle relative to the horizontal plane of a transverse component of the frame member 20. In this orientation, row units 33A may be operational and engaged with the soil.

Figure 3:
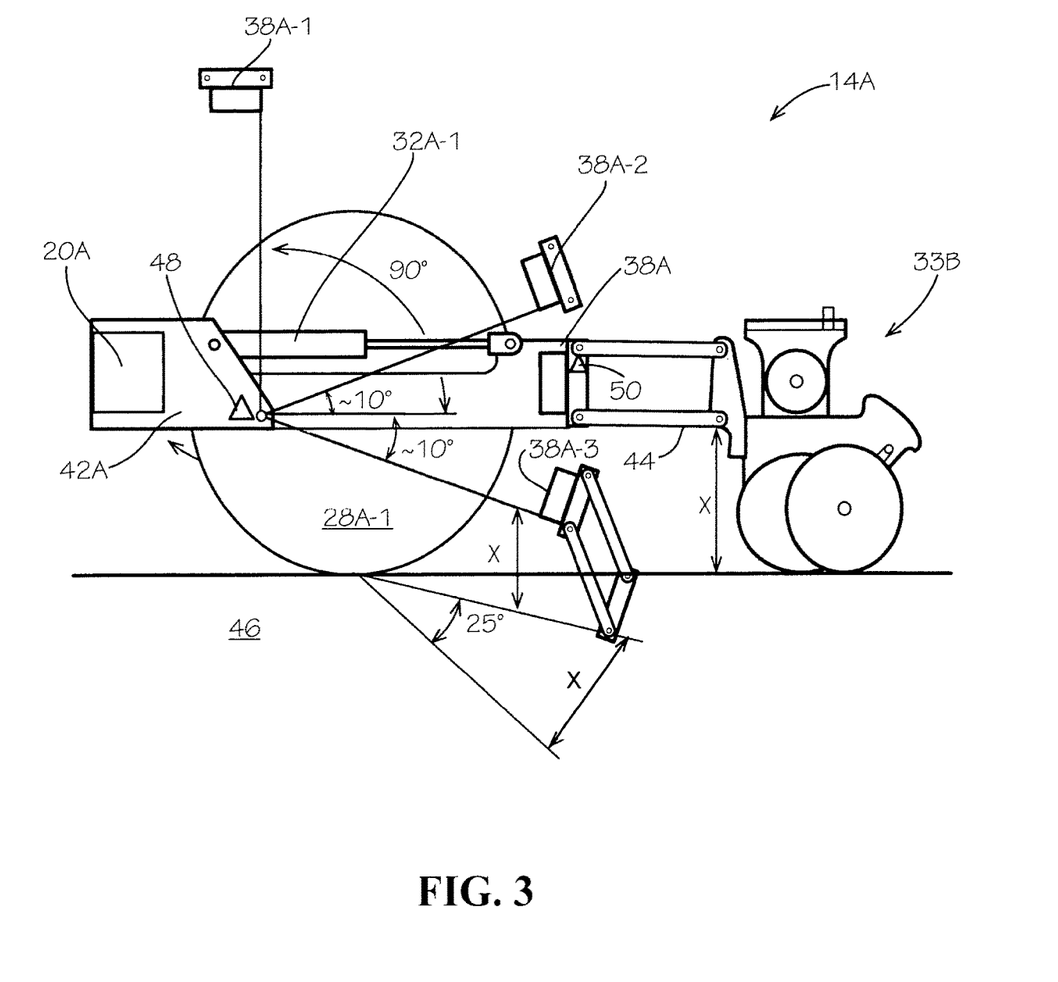
FIG. 3 is a schematic diagram that illustrates, in fragmentary, side elevation view, an embodiment of an example contouring toolbar system with an implement comprising a toolbar in various angular positions.

Referring now to FIG. 3, shown is an embodiment of an example contouring toolbar system with an implement 14A comprising a toolbar 38A in various angular positions. The implement 14A shown in FIG. 3 may be similarly structured and configured as implement 14 shown in FIGS. 1-2. The implement 14A is depicted diagrammatically with the frame member 20A comprising a bracket arm 42A, the bracket arm 42A pivotably coupled to the toolbar 38A (e.g., via a hinged connection at the bracket arm 30 (FIG. 2) and the bracket arm 42). The actuator 32A-1 provides for retracting and extending movements that cause the toolbar 38A to rotate relative to the frame member 20A. The toolbar 38A is coupled to the row unit 33B via a linkage 44. The linkage 44 is comprised of a parallelogram structure, as is known, and permits limited parallelogram motion between the toolbar 38A and the row unit 33B. The wheel 28A-1 is coupled to the frame member 20 in known manner, similar to that shown in FIG. 2, though as described above, some embodiments may use different chassis configurations and hence are contemplated to be within the scope of the disclosure. The implement 14A is shown resting on a field 46, the field 46 shown as a level surface and also angled to represent where the actuator 32A-1 needs to drop (extend) the toolbar 38A to follow the varying contours of the field surface. One of the points FIG. 3 is illustrating is that an embodiment of a contouring toolbar system is persistently attempting to control the "X" dimension to keep the row unit 33B engaged with the ground (e.g., to enable proper seeding, agitation, etc.). The "X" dimension is referenced relative to a location proximal to the row unit connection to the toolbar 38A (e.g., via the parallelogram linkage connection) relative to the ground, and hence corresponds to the toolbar position relative to the ground.

The toolbar 38A (38A in zero-angle position) is shown in multiple angular positions, including toolbar 38A-1, toolbar 38A-2, and toolbar 38A-3. At toolbar 38A-1, the actuator 32A-1 has raised (e.g., via full retraction of the corresponding rod) the toolbar 38A-1 to approximately 90 degrees (e.g., relative to a level surface or a longitudinal axis of the frame member 20A) for narrow transport.

At toolbar 38A-2, the actuator 32A-1 has raised the toolbar 38A-2 to approximately 10 degrees relative to a level surface or a longitudinal axis of the frame member 20A. Such actuation may occur, for instance, if the row unit 33B was traversing the backside of a terrace to attempt to control the X dimension relative to the ground surface to keep the row unit 33B engaged (which also may prevent excessive loads on the row unit 33B). Also, for field operations, an intermediate position of the toolbar 38A proximal to that depicted in FIG. 3 for toolbar 38A-2 may be sensed for permitting headland turning. For instance, the toolbar 38A may be raised to approximately 20-30 degrees, the rotation sensed to enable the controller 34 to stop at that operational position.

At toolbar 38A-3, the actuator 32A-1 has lowered the toolbar 38A-3 below zero degrees (e.g., approximately 10 degrees below the zero angular position). Such an actuation may occur if the row unit 33B was traveling on the upside of a hill as in the depicted example (the row unit 33B not actually shown traversing the slope of 25 degrees for ease of illustration). In other words, the actuation serves to attempt to maintain the X dimension of the toolbar 38A (e.g., and similarly, the row unit 33B), which in turn also avoids lifting the row unit 33B off of the surface of the field 46. As set forth above, additional actuation may be performed for even greater changes in traversed field contour (e.g., 25 degrees) in order to control the "X" dimension. As illustrated in FIG. 3, the toolbar position is adjusted to attempt to maintain a level operating position relative to the contour of the surface and to enable proper engagement of the row unit 33B with the field 46.

In one embodiment, the control of the actuation is based on one or more sensors that sense the position of the toolbar 38A. The sensors may be disposed for each row unit 33B of a planter, or one or more sensors may be used for all of the row units 33B. In general, to enable the toolbar 38A (and hence toolbar 38A) to follow the contour of the field, sensor information is received about the (relative) position of the toolbar 38A (and by extension, the relative position of the row unit 33B) relative to the ground. A row unit sensor, such as sensor 50, is used for the contouring operation. In one embodiment, at least one row unit sensor 50 is used, though in some embodiments, there may be a row unit sensor 50 per every row unit 33B. Further, toolbar rotation for field operations may also rely on sensor information. For instance, at the end of a "pass", the row units 33B are lifted to a headland position, the towing vehicle turns around, and the row units 33B are lowered again to engage the field for the next pass. This operation is referred to as headland turning, which involves transitioning from a contouring or field operation position of the toolbar 38A (and hence row units 33B) to a pre-configured (or in some embodiments, operator-configured) intermediate angle of the toolbar 38A. Headland turning benefits from the use of sensor information about the toolbar position relative to the frame 20A. In one embodiment, one or more sensors, including sensor 48, may be used to provide this information. There may be a single sensor 48 corresponding to plural row units, or multiple sensors 48 (e.g., per row unit 33B). The sensor 48 may also be used for enabling transport, such as triggering an electronic stop (from signaling of the controller 34) when the toolbar 38A has reached the transport position (e.g., approximately 90 degrees).

The sensor 48 may be positioned proximal to the pivot point of the bracket arm 42 of the frame member 20 and where the toolbar 38A couples to the bracket arm 42. In this position, the sensor 48 senses the angular position and/or change in angular position between the toolbar 38A and the frame member 20. The sensor 50 may be located at the pivot point between the linkage 44 and the toolbar 38A, and used to sense the position of the toolbar 38A (and hence the position of the row unit 33B) relative to the ground. That is, the contouring toolbar system attempts to follow the contour of the field 46 (controlling the "X" dimension) as pivoting areas begin to move in response to the changes in field surfaces. In short, the contouring toolbar system attempts to keep the "X" dimension or the toolbar 38A relatively constant relative to the ground and also control the travel of the toolbar 38A in a manner that keeps the row unit 33B engaged with the ground.

In one embodiment, the sensors 48 and 50 may each be configured as a rotary encoder that provides an angle value for every programmed amount of sensed rotation. For instance, the rotary encoder may be optically-based, and for every detected rotation or click (e.g., assuming a single rotation or "click" per single degree, though other resolutions may be used), the controller 34 (FIG. 1) can track based on a signal from the sensors 48, 50 at what angle the toolbar 38A has rotated relative to the frame 20A (from sensor 48) and the ground (from sensor 50).

For contouring control, the controller 34 may be programmed to trigger actuation of the actuator 32A-1 based on a sensed (e.g., from sensor 50) defined threshold degree value away from a zero degree reference, providing a buffer to excessive actuations. In some embodiments, the rate of rotation may also trigger the controller 34 to communicate the speed of actuation. For instance, at a single click of the sensor 50, the controller 34 may communicate an actuation speed of a defined percentage (e.g., 1%) or value, and a 5 degree rotation may trigger communication of a faster speed (e.g., 50%) to serve in an anticipatory manner to avoid wide or rapid stroke of the actuator 32A-1.

In some embodiments, the sensors 48 and/or 50 may be configured as non-contact type, electromagnetic sensors, including ultrasonic, radar, or lidar type sensors, or as a combination of angular position and non-contact types. For instance, the electromagnetic sensors may detect the position of the ground (e.g., via transmittal to and reflection from the ground) relative to the toolbar 38A and communicate a signal to the controller 34 to cause adjustment of the toolbar 38A to control (e.g., maintain) the toolbar-to-ground dimension X substantially constant. Note that in some embodiments, the electromagnetic sensors may be located in other locations, including at the row unit 33B, the electromagnetic sensors may be configured to detect an absolute elevation of the toolbar 38A relative to ground or a change in elevation relative to ground.

Figure 4A:
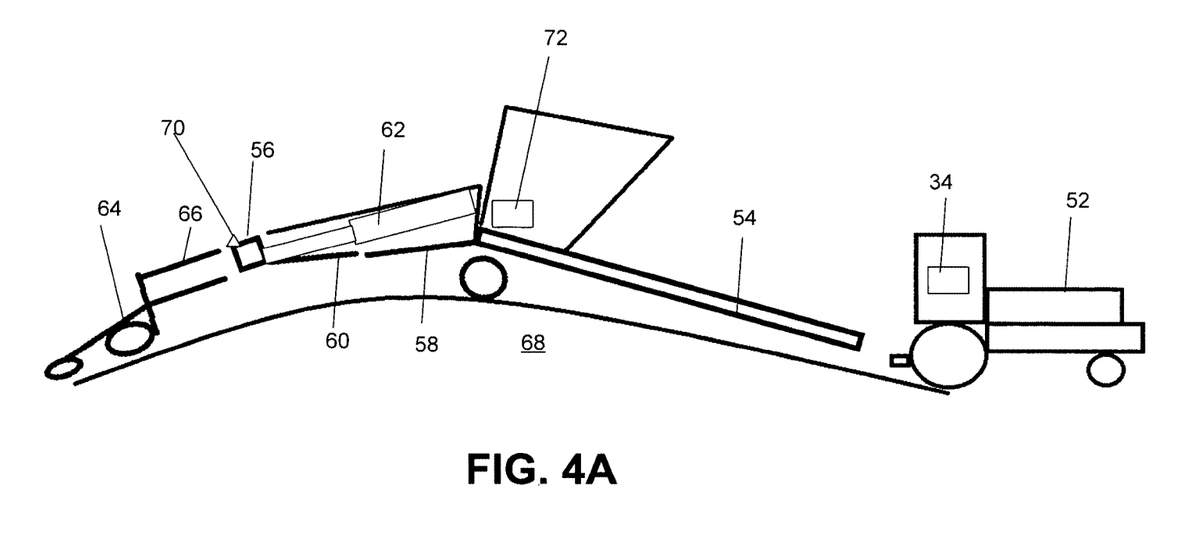
FIGS. 4A-4B are schematic diagrams that illustrate, in fragmentary side elevation view, example field contours that trigger activation of the actuators of an embodiment of an example contouring toolbar system.
Figure 4B:
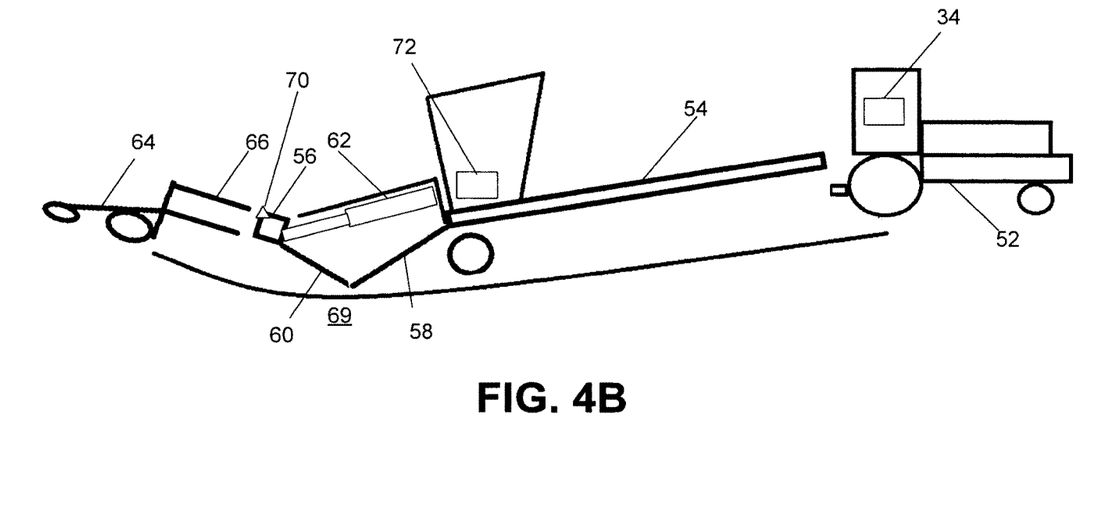

Attention is now directed to FIGS. 4A-4B, which illustrate, diagrammatically, example operations of an embodiment of a contouring toolbar system. Shown is a tractor 52 coupled to a planter frame 54. The planter frame 54 is pivotably coupled to a toolbar 56 via bracket arms 58, 60. Coupled between bracket arms 58, 60 is actuator 62. The toolbar 56 is further coupled to the row unit 64 via linkage 66. Note that the planter frame 54 may be similar to the frame member 20 (FIG. 1), and the bracket arms 58, 60 may be similar to bracket arms 42 and 30 (FIGS. 1-2). Also, the toolbar 56 may be similar to toolbar 38 (FIG. 3), and the row unit 64 and linkage 66 may be similar to the row unit 33 (FIGS. 1-2) and linkage 44 (FIG. 3), respectively. Referring to FIG. 4A, the planter frame 54 is shown commencing a downward slope of a hill 68. An angle sensor 70 positioned proximal to the toolbar 56 and row unit 64 and senses a change in position of the toolbar 56 (and hence row unit 64) relative to the ground and signals to the controller 34. The controller 34, in turn, processes the received signal and signals to a control component 72 to change a state of the actuator 62 (e.g., change in pressure and/or fluid flow in the case of a hydraulic actuator) according to the determined angular change, resulting in the rod of the actuator 62 extending to rotate the toolbar 56 downward to adjust to the change in contour. Note that in conventional systems, the row unit may be lifted off of the ground due to the rigid structures involved, resulting in insufficient planting depth.

Referring to FIG. 4B, the planter frame 54 is traversing up a slope while the row unit 64 is heading down to a valley 69 or gulley. The sensor 70 senses the change in angular position of the toolbar 56 (and row unit 64) relative to the ground and signals to the controller 34. The controller 34 in turn signals to the control component 72 according to the determined angular change, resulting in the rod of the actuator 62 being retracted to cause the toolbar 56 to rotate up to adjust to the change in contour. In a conventional system, the row unit may lose engagement with the field, resulting in the deposit of seed at too much depth, affecting yield negatively. Also, the row unit in a conventional system may be exposed to excessive forces (e.g., possibly causing the row unit to damage or break off).

Figure 5A:
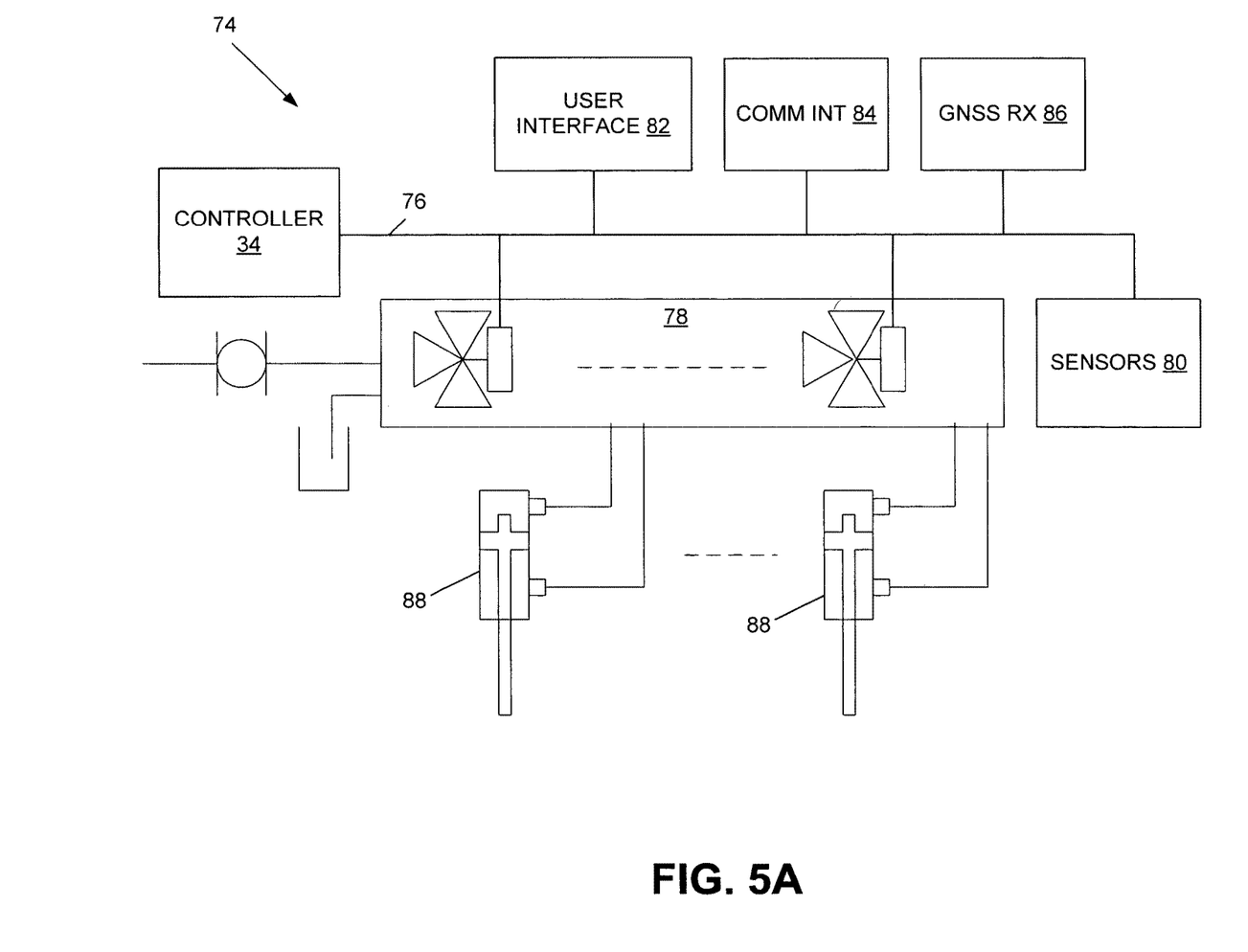
FIG. 5A is a block diagram that illustrates an example control system for an embodiment of an example contouring toolbar system.

Reference is now made to FIG. 5A, which illustrates an embodiment of an example control system 74 used for controlling operations of the toolbar rotations for an embodiment of a contouring toolbar system. It should be appreciated within the context of the present disclosure that some embodiments may include additional components or fewer or different components, and that the example depicted in FIG. 5A is merely illustrative of one embodiment among others. The control system 74 may be located entirely on the implement (e.g., implement 14, FIG. 1), distributed among the towing vehicle (e.g., tractor 12, FIG. 1) and the implement, or among additional devices (e.g., remote control). Further, though depicted using a single controller 34, in some embodiments, the control system 74 may be comprised of plural controllers similarly configured to controller 34. In the depicted embodiment, the controller 34 is coupled via one or more networks, such as network 76 (e.g., a CAN network or other network, such as a network in conformance to the ISO 11783 standard, also referred to as "Isobus"), to control components 78, one or more sensors 80, a user interface 82, a communications interface (COMM INT) 84, and a global navigation satellite systems (GNSS) receiver 86. The control components 78 may be configured similarly to control components 36 (FIGS. 1) and 72 (FIG. 4A). The sensors 80 may be configured similarly to sensors 48, 50 (FIG. 3), and/or 70 (FIG. 4A). Note that control system operations are primarily disclosed herein in the context of control via the single controller 34, with the understanding that additional controllers may be involved in one or more of the disclosed functionality in some embodiments.

The control components 78 may comprise a manifold comprising one or more or a combination thereof of control valves, air valves, switches, relays, solenoids, motors, etc., to cause actuation of the actuators (e.g., actuator 32, FIG. 2) that control the rotation of the toolbars (e.g., toolbar 38, FIG. 2). In the depicted example, the control components 78 comprises one or more multi-position (e.g., 3-position) hydraulic control valves with coupled solenoids, the solenoids receiving signaling from the controller 34 and causing movement of a spool or poppet(s) of the control valves. The control valves in turn regulate the flow into and out of actuators that, in one embodiment, comprise linear acting, rod and single piston-type hydraulic cylinders 88. The regulation of the flow and/or pressure across the piston enables the retraction or extension of the rod as needed. As suggested above, the control technology may be comprised of pneumatic, electric, magnetic, or electromagnetic.

The sensors 80 may be comprised of angle positioning sensors (e.g., rotary encoders, including optical based or other electromagnetic frequencies), or non-contact type sensors, including radar, acoustic, lidar, among others. In some embodiments, a combination of these types of sensors may be used. The sensors 80 are used to determine the position of the row unit toolbar, including via the determination of the distance between the toolbar and the ground surface and/or the angular position of the toolbar relative to the frame member (e.g., frame member 20, FIG. 1).

The user interface 82 may include one or more components, including one or any combination of a keyboard, mouse, microphone, touch-type or non-touch-type display device (e.g., display monitor or screen), joystick, steering wheel, FNR lever, and/or other devices (e.g., switches, immersive head set, etc.) that enable input and/or output by an operator. For instance, in some embodiments, the user interface 82 may be used to present on a display screen implement control options (e.g., drop the toolbar for engagement of the row units with the soil, raise the toolbar for headlands, raise the toolbar for transport, etc.) for the operator to choose from, and/or the user interface 82 may provide feedback of when these actions are taken or about to be taken when performed automatically (e.g., providing an operator the opportunity to reject or acknowledge or merely observe). In some embodiments, the feedback may be in the form of recommendations to the operator for taking certain actions. In one embodiment, a visual of the implement may be presented on the screen, with the sensor data communicated in the form of data and/or a visual of the movement of the toolbar relative to the field contour. In some embodiments, the functions of manually rotating the toolbar to various operational positions may be performed via actuation of a switch, lever, handle, etc., or verbally commanded.

The communications interface 84 may comprise a wireless network interface module (e.g., including an RF and/or cellular modem) for wireless communication among other devices of the towing vehicle/implement combination or with remote devices (e.g., external from the implement and towing vehicle). The communications interface 84 may work in conjunction with communication software (e.g., including browser software) in the controller 34, or as part of another controller coupled to the network 76 and dedicated as a gateway for wireless communications with other devices or networks. The communications interface 84 may comprise MAC and PHY components (e.g., radio circuitry, including transceivers, antennas, etc.), as should be appreciated by one having ordinary skill in the art.

The GNSS receiver (GNSS RX) 86 may be comprised of a GPS receiver, for instance, to receive location coordinates of the towing vehicle and/or implement. The GNSS receiver 86 may function in cooperation with field maps stored locally in the controller 34 (or accessed from, a remote server) to enable detection of headlands, roads, field entrances, and/or locations for surface features (e.g., hills, gullies), etc. For instance, the use of locations of surface features may be used in part to enable the controller 34 to improve anticipation of the extent (e.g., speed) of actuation for rotating the toolbar.

Figure 5B:
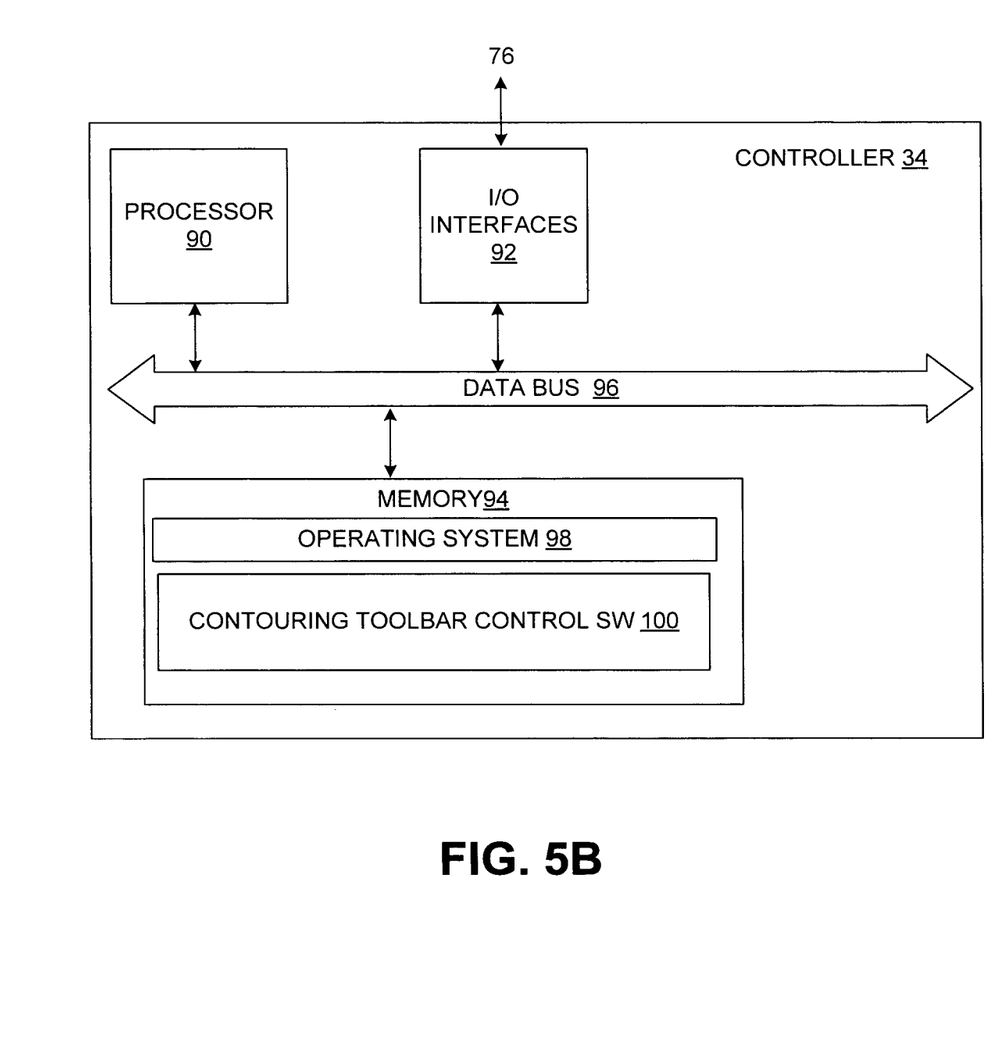
FIG. 5B is a block diagram that illustrates an example controller for the control system of FIG. 5A.

FIG. 5B further illustrates an example embodiment of the controller 34. One having ordinary skill in the art should appreciate in the context of the present disclosure that the example controller 34 is merely illustrative, and that some embodiments of controllers may comprise fewer or additional components, and/or some of the functionality associated with the various components depicted in FIG. 5B may be combined, or further distributed among additional modules, in some embodiments. It should be appreciated that, though described in the context of residing in a towing vehicle (e.g., the tractor 52 (FIG. 4A), in some embodiments, the controller 34, or all or a portion of its corresponding functionality, may be implemented at the implement (e.g., implement 14, FIG. 1) or in a computing device or system located external to the tractor and/or implement. Referring to FIG. 5B, with continued reference to FIG. 5A, the controller 34 or electronic control unit (ECU) is depicted in this example as a computer, but may be embodied as a programmable logic controller (PLC), field programmable gate array (FPGA), application specific integrated circuit (ASIC), among other devices. It should be appreciated that certain well-known components of computers are omitted here to avoid obfuscating relevant features of the controller 34. In one embodiment, the controller 34 comprises one or more processors (also referred to herein as processor units or processing units), such as processor 90, input/output (I/O) interface(s) 92, and memory 94, all coupled to one or more data busses, such as data bus 96. The memory 94 may include any one or a combination of volatile memory elements (random-access memory RAM, such as DRAM, and SRAM, etc.) and nonvolatile memory elements (e.g., ROM, Flash, hard drive, EPROM, EEPROM, CDROM, etc.). The memory 94 may store a native operating system, one or more native applications, emulation systems, or emulated applications for any of a variety of operating systems and/or emulated hardware platforms, emulated operating systems, etc.

In the embodiment depicted in FIG. 5B, the memory 94 comprises an operating system 98 and contouring toolbar control software (SW) 100. It should be appreciated that in some embodiments, additional or fewer software modules (e.g., combined functionality) may be deployed in the memory 94 or additional memory. For instance, the memory 94 may also include browser software and/or communications software. In some embodiments, a separate storage device may be coupled to the data bus 96, such as a persistent memory (e.g., optical, magnetic, and/or semiconductor memory and associated drives).

The contouring toolbar control software (SW) 100 receives input from the user interface 82 (via the I/O interfaces 92 and network 76) and sensor input from the sensors 80 (via the I/O interfaces 92 and network 76). In some embodiments, the contouring toolbar control software (SW) 100 may receive additional input, including location coordinates from the GNSS receiver, such as to identify certain surface features, headlands, and/or roads to trigger certain toolbar rotations. As suggested above, the sensor input is converted to an actuation signal (including a magnitude and optionally a rate), which is used to cause a suitable stroke to meet the required compensatory motion by the actuator (e.g., cylinders 88) to adjust the toolbar rotation. In some embodiments, operator input at the user interface 82 is also communicated and translated to an actuation signal to maneuver the toolbar to an appropriate position (e.g., to raise the toolbar at a headland, for narrow transport, etc.). The contouring toolbar control software (SW) 100 also provides user interface functionality to provide feedback of certain toolbar rotations, with or without the ability for the operator to intervene as explained previously.

Execution of the contouring toolbar control software (SW) 100 may be implemented by the processor 90 under the management and/or control of the operating system 98. The processor 90 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 34.

The I/O interfaces 92 provide one or more interfaces to the network 76 and other networks. In other words, the I/O interfaces 92 may comprise any number of interfaces for the input and output of signals (e.g., analog or digital data) for conveyance of information (e.g., data) over the network 76. The input may comprise input by an operator (local or remote) through the user interfaces 82 and input from signals carrying information from one or more of the components of the control system 74, as explained above.

When certain embodiments of the controller 34 are implemented at least in part with software (including firmware), as depicted in FIG. 5B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 34 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
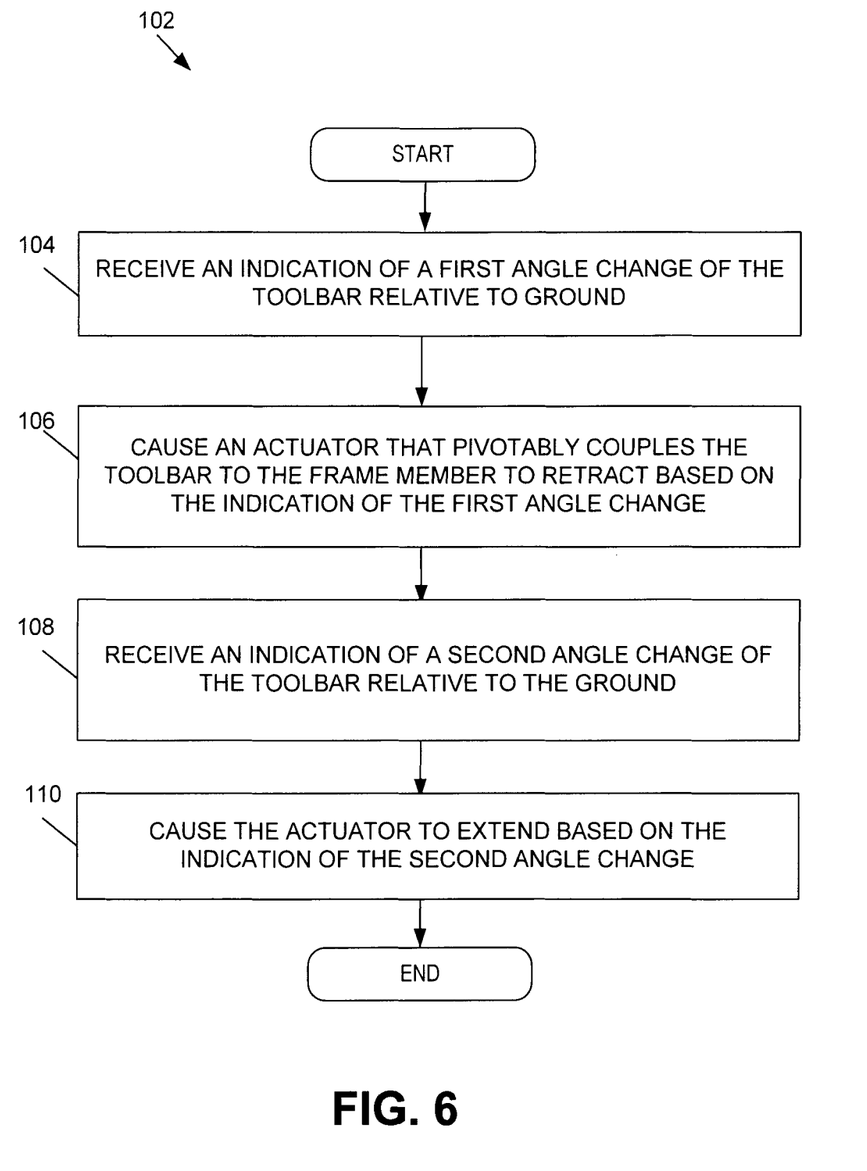
FIG. 6 is a flow diagram that illustrates an embodiment of an example contouring toolbar method.

Having described some example embodiments of a contouring toolbar system, it should be appreciated in view of the present disclosure that one embodiment of a computer-implemented method for an implement that comprises a toolbar that has row units secured thereto, the method for adjusting a rotation of the toolbar based on a contour of a field on which the implement traverses, the method denoted as method 102 and illustrated in FIG. 6, comprises, at a controller (e.g., controller 34, FIG. 5B): receiving an indication of a first angle change of the toolbar relative to ground (104); causing an actuator that pivotably couples the toolbar to the frame member to retract based on the indication of the first angle change (106); receiving an indication of a second angle change of the toolbar relative to the ground (108); and causing the actuator to extend based on the indication of the second angle change (110).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of a contouring toolbar system are merely possible examples of implementations, merely set forth for a clear understanding of the principles of the contouring toolbar system. Many variations and modifications may be made to the above-described embodiment(s) of the contouring toolbar system without departing substantially from the spirit and principles of the disclosure. All such modifications and variations are intended to be included herein within the scope of the disclosure and protected by the following claims.

The invention claimed is:

1. A system, comprising:
an elongate frame member;
an elongate toolbar coupled to the frame member via a hinged joint, the toolbar oriented parallel to the frame member;
a plurality of row units coupled to the toolbar;
a first sensor configured to sense a position of the toolbar relative to ground;
a second sensor configured to sense an angle of the toolbar relative to the frame member; and
an actuator coupled between the frame member and the toolbar, the actuator configured to rotate the toolbar relative to the frame member based on a sensed position of the toolbar, wherein the toolbar remains parallel to the frame member throughout the rotation of the toolbar.

2. The system of claim 1, further comprising a controller configured to receive first and second signals from the first and second sensors and cause actuation of the actuator based on the first and second signals.

3. The system of claim 2, further comprising a control component that actuates the actuator, wherein the controller is configured to cause actuation by sending a signal to the control component.

4. The system of claim 3, wherein the control component comprises a control valve, an air valve, an electronic control component, a magnetic control component, or an electromagnetic control component.

5. The system of claim 2, wherein the controller is further configured to cause adjustment of a rate of rotation based on the first signals from the first sensor.

6. The system of claim 1, further comprising a controller, the controller configured to receive a signal from the first sensor and cause actuation of the actuator based on the signal.

7. The system of claim 6, further comprising a control component that actuates the actuator, wherein the controller is configured to cause actuation by sending a signal to the control component.

8. The system of claim 7, wherein the control component comprises a control valve, an air valve, an electronic control component, a magnetic control component, or an electromagnetic control component.

9. The system of claim 6, wherein the controller is further configured to cause adjustment of a rate of rotation based on the signal from the first sensor.

10. The system of claim 1, wherein the sensed position is relative to a field surface, further comprising one or more electromagnetic sensors coupled to the frame member, the toolbar, or a combination of the frame member and the toolbar, the one or more electromagnetic sensors configured to sense an absolute elevation or change in elevation between the field surface and the toolbar or a combination of both the frame member and the toolbar.

11. The system of claim 10, further comprising a controller configured to receive one or more signals from the one or more electromagnetic sensors and cause actuation of the actuator based on the one or more signals.

12. The system of claim 11, further comprising a control component that actuates the actuator, wherein the controller is configured to cause actuation by sending a signal to the control component.

13. The system of claim 12, wherein the control component comprises a control valve, an air valve, an electronic control component, a magnetic control component, or an electromagnetic control component.

14. The system of claim 11, wherein the controller is further configured to cause adjustment of a rate of rotation based on the one or more signals from the one or more electromagnetic sensors.

15. The system of claim 10, wherein the one or more electromagnetic sensors comprise ultrasonic, lidar, or radar sensors.

16. The system of claim 1, wherein the actuator is configured to rotate the toolbar throughout an obtuse angle range.

17. A control system for an implement comprising a frame member and a toolbar coupled to the frame member parallel to the frame member via a hinged joint such that the toolbar remains parallel to the frame member throughout the rotation of the toolbar about the hinged joint, wherein a plurality of row units are secured to the toolbar, the control system comprising:
  a controller;
  a first sensor configured to sense a position of the toolbar relative to ground;
  a second sensor configured to sense an angle of the toolbar relative to the frame member; and
  an actuator coupled between the frame member and the toolbar, wherein the controller is configured to receive at least one signal from the at least one sensor indicating the position of the toolbar relative to the ground and cause the actuator to rotate the toolbar based on the sensed position of the toolbar.

18. The system of claim 1, further comprising at least one wheel coupled to the frame member and at least partially supporting the frame member relative to the ground.

* * * * *